(12) United States Patent
Johnson et al.

(10) Patent No.: US 7,755,505 B2
(45) Date of Patent: Jul. 13, 2010

(54) PROCEDURE FOR ADDRESSING REMOTELY-LOCATED RADIO FREQUENCY COMPONENTS OF A CONTROL SYSTEM

(75) Inventors: Benjamin A. Johnson, Quakertown, PA (US); Justin Mierta, Allentown, PA (US); Brian Michael Courtney, Bethlehem, PA (US); Lawrence R. Carmen, Jr., Bath, PA (US); Daniel Curtis Raneri, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 943 days.

(21) Appl. No.: 11/470,367

(22) Filed: Sep. 6, 2006

(65) Prior Publication Data

US 2008/0068126 A1    Mar. 20, 2008

(51) Int. Cl.
*H02J 13/00* (2006.01)
*G05B 19/02* (2006.01)
*H04Q 5/22* (2006.01)

(52) U.S. Cl. .................. 340/825.52; 340/825.22; 340/10.52

(58) Field of Classification Search ............ 340/825.52, 340/825.22, 10.52
See application file for complete search history.

(56) References Cited

U.S. PATENT DOCUMENTS

| | | | |
|---|---|---|---|
| 4,114,099 A | 9/1978 | Hollander | |
| 4,529,980 A | 7/1985 | Liotine et al. | |
| 4,864,588 A | 9/1989 | Simpson et al. | |
| 4,932,037 A | 6/1990 | Simpson et al. | |
| 4,995,053 A | 2/1991 | Simpson et al. | |
| 5,239,205 A | 8/1993 | Hoffman et al. | |
| 5,340,954 A | 8/1994 | Hoffman et al. | |
| 5,365,551 A | 11/1994 | Snodgrass et al. | |
| 5,375,254 A | 12/1994 | Owen | |
| 5,454,077 A | 9/1995 | Cheron | |
| 5,467,266 A | 11/1995 | Jacobs et al. | |
| 5,671,387 A | 9/1997 | Jacobs et al. | |

(Continued)

FOREIGN PATENT DOCUMENTS

EP    0 767 551    4/1997

(Continued)

OTHER PUBLICATIONS

Specification of the Bluetooth System, Version 1.1, Feb. 22, 2001, pp. 1-5 and 51-52.*

(Continued)

*Primary Examiner*—Benjamin C Lee
*Assistant Examiner*—Andrew Bee
(74) *Attorney, Agent, or Firm*—Ostrolenk Faber LLP (57) ABSTRACT

A wireless lighting control system has a plurality of control devices, some of which may be remotely-located. Each of the control devices is operable to be coupled to a source of power and to be assigned a unique device address. To assign a unique address to the control devices that are remotely-located, power is cycled to those control devices, i.e., by interrupting and restoring power to the control devices. The control device then transmits wirelessly a signal uniquely identifying the control device within a predetermined amount of time after the cycling of power. A list of unaddressed control devices that have recently been power cycled is generated. Each of the control devices on the list is then assigned and transmitted a unique device address.

26 Claims, 5 Drawing Sheets

U.S. PATENT DOCUMENTS

| | | | |
|---|---|---|---|
| 5,736,965 | A | 4/1998 | Mosebrook et al. |
| 5,818,128 | A | 10/1998 | Hoffman et al. |
| 5,838,226 | A | 11/1998 | Houggy et al. |
| 5,848,054 | A | 12/1998 | Mosebrook et al. |
| 5,905,442 | A | 5/1999 | Mosebrook |
| 5,982,103 | A | 11/1999 | Mosebrook et al. |
| 6,175,201 | B1 | 1/2001 | Sid |
| 6,275,476 | B1 | 8/2001 | Wood, Jr. |
| 6,324,089 | B1 | 11/2001 | Symoen et al. |
| 6,388,399 | B1 | 5/2002 | Eckel et al. |
| 6,535,109 | B1 | 3/2003 | Mahdavi |
| 6,661,336 | B1 | 12/2003 | Atkins et al. |
| 6,687,487 | B1 | 2/2004 | Mosebrook et al. |
| 6,803,728 | B2 | 10/2004 | Balasubramaniam |
| 6,812,843 | B2 | 11/2004 | Soto et al. |
| 6,819,223 | B2 | 11/2004 | Amtmann |
| 6,831,562 | B2 | 12/2004 | Rodgers et al. |
| 6,831,569 | B2 | 12/2004 | Wang et al. |
| 6,856,236 | B2 | 2/2005 | Christensen et al. |
| 6,876,294 | B1 | 4/2005 | Regan |
| 6,879,806 | B2 | 4/2005 | Shorty |
| 6,901,439 | B1 | 5/2005 | Bonasia |
| 6,901,542 | B2 | 5/2005 | Bartenstein et al. |
| 6,927,547 | B2 | 8/2005 | Walko, Jr. et al. |
| 6,975,206 | B2 | 12/2005 | Reining |
| 6,980,080 | B2 | 12/2005 | Christensen et al. |
| 6,983,783 | B2 | 1/2006 | Carmen, Jr. et al. |
| 7,031,735 | B2 | 4/2006 | Koshino |
| 7,054,616 | B2 | 5/2006 | Rickhoff et al. |
| 7,085,627 | B2 | 8/2006 | Bamberger et al. |
| 7,102,502 | B2 | 9/2006 | Autret |
| 7,106,261 | B2 | 9/2006 | Nagel |
| 7,123,140 | B1 | 10/2006 | Denes |
| 7,126,291 | B2 | 10/2006 | Kruse et al. |
| 7,130,584 | B2 | 10/2006 | Hirvonen |
| 7,155,296 | B2 | 12/2006 | Klasson et al. |
| 7,193,504 | B2 | 3/2007 | Carrender et al. |
| 7,211,968 | B2 | 5/2007 | Adamson et al. |
| 7,219,141 | B2 | 5/2007 | Bonasia et al. |
| 7,253,717 | B2 | 8/2007 | Armstrong et al. |
| 7,307,542 | B1 | 12/2007 | Chandler et al. |
| 7,346,016 | B2 | 3/2008 | Nielsen et al. |
| 7,486,172 | B2 | 2/2009 | Martinez et al. |
| 7,498,924 | B2 | 3/2009 | Scherabon |
| 2002/0043938 | A1 | 4/2002 | Lys |
| 2002/0046226 | A1 | 4/2002 | Nakabe et al. |
| 2002/0049822 | A1* | 4/2002 | Burkhardt et al. ........... 709/208 |
| 2002/0126020 | A1* | 9/2002 | Wang et al. ............ 340/825.52 |
| 2002/0140379 | A1 | 10/2002 | Chevalier et al. |
| 2002/0154025 | A1 | 10/2002 | Ling |
| 2003/0040813 | A1* | 2/2003 | Gonzales et al. .............. 700/19 |
| 2003/0109270 | A1 | 6/2003 | Shorty |
| 2004/0051467 | A1 | 3/2004 | Balasubramaniam et al. |
| 2004/0158624 | A1 | 8/2004 | Bodin et al. |
| 2004/0250964 | A1* | 12/2004 | Carmen et al. .............. 160/120 |
| 2005/0102040 | A1 | 5/2005 | Kruse et al. |
| 2005/0280598 | A1 | 12/2005 | Webb et al. |
| 2006/0002110 | A1 | 1/2006 | Dowling et al. |
| 2006/0071757 | A1 | 4/2006 | Burghard et al. |
| 2006/0125426 | A1 | 6/2006 | Veskovic |
| 2006/0171332 | A1 | 8/2006 | Barnum |
| 2006/0174102 | A1 | 8/2006 | Smith et al. |
| 2006/0273970 | A1 | 12/2006 | Mosebrook et al. |
| 2006/0284734 | A1 | 12/2006 | Newman, Jr. |
| 2007/0076650 | A1 | 4/2007 | Manjeshwar et al. |
| 2007/0126555 | A1 | 6/2007 | Bandy |
| 2007/0139164 | A1 | 6/2007 | O'Toole et al. |
| 2007/0159305 | A1 | 7/2007 | Cesar et al. |
| 2007/0200677 | A1 | 8/2007 | Murano |
| 2008/0055073 | A1 | 3/2008 | Raneri |
| 2008/0068126 | A1 | 3/2008 | Johnson |
| 2008/0068204 | A1 | 3/2008 | Carmen |
| 2008/0089266 | A1 | 4/2008 | Orsat |
| 2008/0092075 | A1 | 4/2008 | Jacob et al. |
| 2008/0111491 | A1 | 5/2008 | Spira |
| 2008/0125057 | A1 | 5/2008 | Nass et al. |
| 2008/0136663 | A1 | 6/2008 | Courtney |
| 2009/0201135 | A1 | 8/2009 | Kawamura et al. |

FOREIGN PATENT DOCUMENTS

| | | | |
|---|---|---|---|
| EP | 1513376 | * | 9/2003 |
| EP | 1 513 376 | | 3/2005 |
| EP | 1 693 991 A1 | | 8/2006 |
| GB | 2410867 | | 8/2005 |
| JP | 03 244954 | | 10/1991 |
| JP | 2003 087403 | | 3/2003 |
| WO | WO 97/29467 | | 8/1997 |
| WO | WO 01/52515 | | 7/2001 |
| WO | WO 02/071689 | | 9/2002 |
| WO | WO 03/007665 | | 1/2003 |
| WO | WO 2006/046104 | | 5/2006 |
| WO | WO2006099422 A2 | | 9/2006 |

OTHER PUBLICATIONS

Eriksson, H. et al. "Performance of dynamic channel allocation in the DECT system," May 19, 1991, 1991 IEEE 41th Vehicular Technology Conference, St. Louis, May 19-22, 1991, IEEE Vehicular Technology Conference, New York, IEEE, US, pp. 693-698.

Z-Wave Alliance Day Technical Seminar Slides from www.z-wavealliance.com, Jun. 14, 2005, 32 sheets.

ZENSYS A/S, Z-Wave Protocol Overview, Document No. SDS10243, Version 2, Apr. 24, 2006, 20 pages.

* cited by examiner

PROCEDURE FOR ADDRESSING REMOTELY-LOCATED RADIO FREQUENCY COMPONENTS OF A CONTROL SYSTEM

BACKGROUND OF THE INVENTION

1. Field of the Invention

The present invention relates to load control systems for controlling electrical loads and more particularly to a procedure for addressing remotely-located control devices of a radio frequency (RF) lighting control system.

2. Description of the Related Art

Control systems for controlling electrical loads, such as lights, motorized window treatments, and fans, are known. Such control systems often use radio frequency (RF) transmission to provide wireless communication between the control devices of the system. Examples of RF lighting control systems are disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and commonly-assigned U.S. Pat. No. 6,803,728, issued Oct. 12, 2004, entitled SYSTEM FOR CONTROL OF DEVICES. The entire disclosures of both patents are hereby incorporated by reference.

The RF lighting control system of the '442 patent includes wall-mounted load control devices, table-top and wall-mounted master controls, and signal repeaters. The control devices of the RF lighting control system include RF antennas adapted to transmit and receive the RF signals that provide for communication between the control devices of the lighting control system. The control devices all transmit and receive the RF signals on the same frequency. Each of the load control devices includes a user interface and an integral dimmer circuit for controlling the intensity of an attached lighting load. The user interface has a pushbutton actuator for providing on/off control of the attached lighting load and a raise/lower actuator for adjusting the intensity of the attached lighting load. The table-top and wall-mounted master controls have a plurality of buttons and are operable to transmit RF signals to the load control devices to control the intensities of the lighting loads.

To prevent interference with other nearby RF lighting control systems located in close proximity, the RF lighting control system of the '442 patent preferably uses a house code (i.e., a house address), which each of the control devices stores in memory. It is particularly important in applications such as high-rise condominiums and apartment buildings that neighboring systems each have their own separate house code to avoid a situation where neighboring systems attempt to operate as a single system rather than as separate systems. Accordingly, during installation of the RF lighting control system, a house code selection procedure is employed to ensure that a proper house code is selected. In order to accomplish this procedure, one repeater of each system is selected as a "main" repeater. The house code selection procedure is initialized by pressing and holding a "main" button on the selected one repeater in one of the RF lighting control systems. The repeater randomly selects one of 256 available house codes and then verifies that no other nearby RF lighting control systems are utilizing that house code. The repeater illuminates a light-emitting diode (LED) to display that a house code has been selected. This procedure is repeated for each neighboring RF lighting control system. The house code is transmitted to each of the control devices in the lighting control system during an addressing procedure described below.

Collisions between transmitted RF communication signals may occur in the RF lighting control system when two or more control devices attempt to transmit at the same time. Accordingly, each of the control devices of the lighting control system is assigned a unique device address (typically one byte in length) for use during normal operation. The device addresses are unique identifiers that are used by the devices of the control system to distinguish the control devices from each other during normal operation. The device addresses allow the control devices to transmit the RF signals according to a communication protocol at predetermined times to avoid collisions. Further, the signal repeaters help to ensure error-free communication by repeating the RF communication signals such that every component of the system receives the RF signals intended for that component.

The house code and the device address are typically included in each RF signal transmitted in the lighting control system. After the house code selection procedure is completed during installation of the lighting control system, an addressing procedure, which provides for assignment of the device addresses to each of the control devices, is executed. In the RF lighting control system described in the '442 patent, the addressing procedure is initiated at a repeater of the lighting control system (e.g., by pressing and holding an "addressing mode" button on the repeater), which places all repeaters of the system into an "addressing mode." The main repeater is responsible for assigning device addresses to the RF control devices (e.g., master controls, wall-mounted load control devices, etc.) of the control system. The main repeater assigns a device address to an RF control device in response to a request for an address sent by the control device.

To initiate a request for the address, a user moves to one of the wall-mounted or table-top control devices and presses a button on the control device (e.g., an on/off actuator of the wall-mounted load control devices). The control device transmits a signal associated with the actuation of the button. This signal is received and interpreted by the main repeater as a request for an address. In response to the request for address signal, the main repeater assigns and transmits a next available device address to the requesting control device. A visual indicator is then activated to signal to the user that the control device has received a system address from the main repeater. For example, lights connected to a wall-mounted load control device, or an LED located on a master control, may flash. The addressing mode is terminated when a user presses and holds the addressing mode button of the repeater, which causes the repeater to issue an exit address mode command to the control system.

The above-described addressing procedure of the control system of the '442 patent requires that the control devices be located in a reasonably accessible fashion to provide for physical contact between a user and an actuator of the RF control device to identify each control device that requires an address. The addressing procedure, therefore, is directed to addressing RF control devices, such as wall-mounted load control devices and master controls, that are adapted for contact by a user during the addressing procedure. The prior addressing procedure, however, is not adapted for addressing RF load control devices that may be mounted in relatively inaccessible locations. For example, load control devices, such as electronic dimming ballasts, motorized window treatments, or remote dimmer modules, may be mounted in remote locations such that contact with the load control device during the addressing procedure is rendered impractical.

Wired control systems (i.e., control systems that utilize wired communication links) for remotely mounted electronic dimming ballasts and motorized window treatments are known in the art. An example of a lighting control system that comprises a plurality of electronic dimming ballasts that are operable to communicate on a wired communication link using the DALI (Digital Addressable Lighting Interface) protocol is described in greater detail in commonly-assigned U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL, the entire disclosure of which is incorporated herein by reference. An example of a control system comprising a plurality of motorized window treatments is described in greater detail in commonly-assigned U.S. Pat. No. 6,983,783, issued Jan. 10, 2006, entitled MOTORIZED SHADE CONTROL SYSTEM, the entire disclosure of which is incorporated herein by reference.

These control systems utilize a random addressing procedure to assign the device addresses. To facilitate the random addressing procedure, each control device comprises a unique serial number, which is stored in memory when the control device is manufactured. The serial number is typically much larger than a device address (e.g., 3 to 6 bytes in length) and is used to uniquely identify each control device during initialization procedures. Because of the relatively large size of the serial number and the potentially large number of control devices in a system, it is often impractical to use the serial number to communicate between control devices during normal operation. Since the serial number is typically transmitted with each message, the messages tend to be larger and the communication times tend to be longer. Therefore, a shorter device address is typically assigned to each control device during the random addressing procedure.

The random addressing procedure is activated, for example, by a user pressing one or more buttons on a wall-mounted keypad of the control system. The selected keypad transmits a query message on the wired link to all unaddressed control devices. Accordingly, all control devices on the wired communication link respond by sending their serial numbers to the selected keypad. The selected keypad receives the serial numbers from all control devices on the link and randomly assigns a unique device address to each control device.

However, since two or more RF lighting control systems may be located in close proximity to each other, such a random addressing procedure may cause the improper initialization of the RF lighting control systems if both systems have unaddressed control devices. Therefore, there is a need for a method of addressing inaccessible remotely-located control devices of an RF lighting control system in which physical contact with the RF control devices is not required.

SUMMARY OF THE INVENTION

According to the present invention, a method for assigning a unique device address to a remotely-located control device in a lighting control system comprises the steps of (1) applying power to the control device; (2) the control device transmitting a signal uniquely identifying the control device within a predetermined amount of time after the step of applying power; and (3) the control device subsequently receiving the unique device address.

The present invention further provides a method for providing an address to a first remote control device in an RF control system. RF control signals are sent from a second device to the first remote control device and each include the address to enable the first remote control device to respond to the RF control signals. The method comprises the steps of cycling power from off to on to the first remote control device to designate the first remote control device as requiring the address; identifying at the second device the remote control device designated as requiring the address; and providing the address to the first remote control device by sending an RF addressing signal from the second device to the first remote control device to enable the first remote control device to respond to RF control signals sent from the second device that include the address.

The present invention further provides a method for selecting a first remotely-located control device from a plurality of control devices in a lighting control system. The method comprises the step of applying power to a subset of the plurality of control devices. The subset contains the first control device. The method further comprises the steps of receiving a signal requesting the serial number at each of the control devices of the subset within a predetermined amount of time after the step of interrupting and restoring power; transmitting the serial number of at least one of the control devices of the subset; generating a list of the serial numbers; and selecting the first control device from the list of serial numbers.

Other features and advantages of the present invention will become apparent from the following description of the invention that refers to the accompanying drawings.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 1:
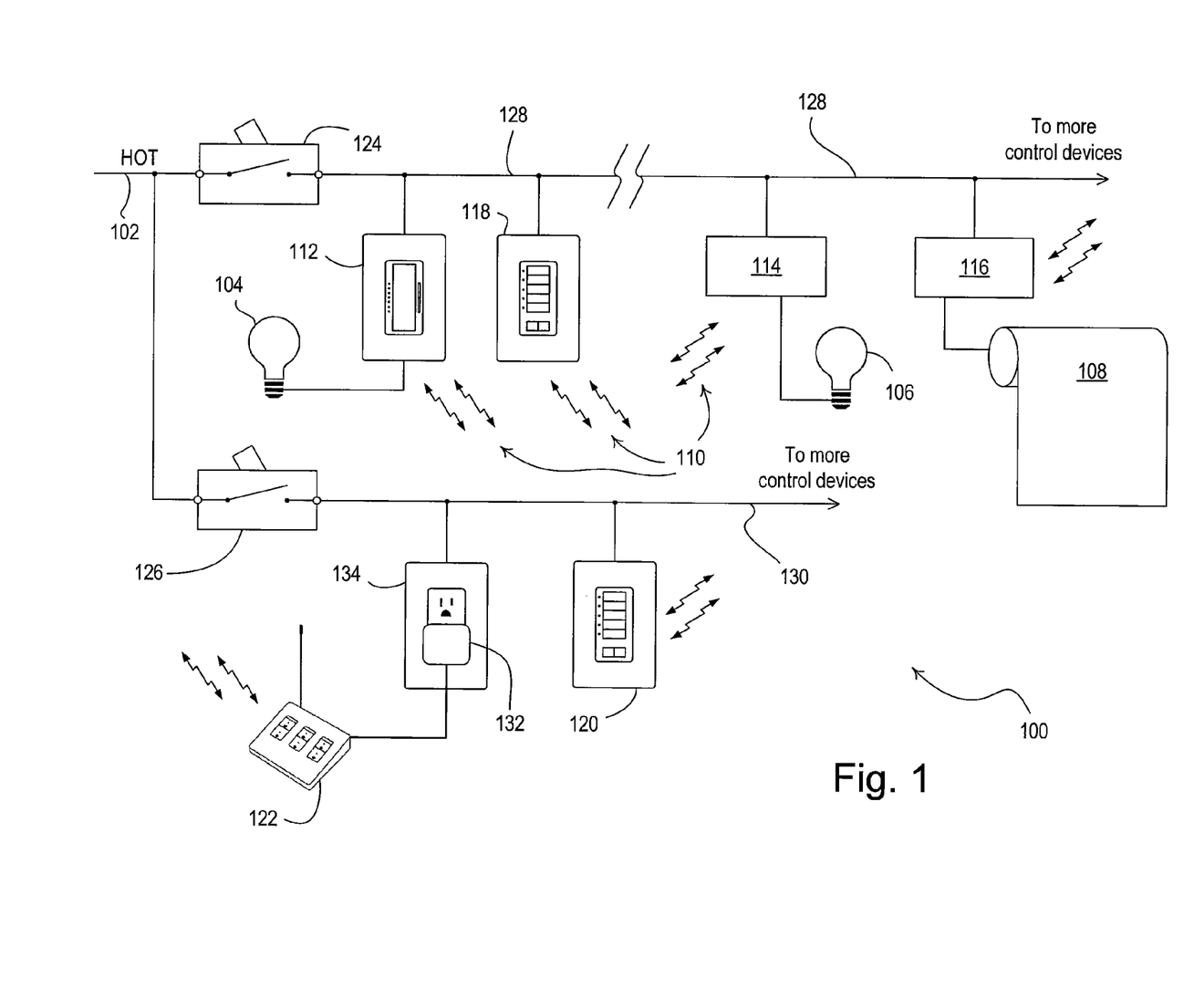
FIG. 1 is a simplified block diagram of an RF lighting control system according to the present invention.

FIG. 1 is a simplified block diagram of an RF lighting control system 100 according to the present invention. The RF lighting control system 100 is operable to control the power delivered from a source of AC power to a plurality of electrical loads, for example, lighting loads 104, 106 and a motorized roller shade 108. The RF lighting control system 100 includes a HOT connection 102 to a source of AC power for powering the control devices and the electrical loads of the lighting control system. The RF lighting control system 100 utilizes an RF communication link for communication of RF signals 110 between control devices of the system.

The lighting control system 100 comprises a wall-mounted dimmer 112 and a remote dimming module 114, which are operable to control the intensities of the lighting loads 104, 106, respectively. The remote dimming module 114 is preferably located in a ceiling area, i.e., near a lighting fixture, or in another remote location that is inaccessible to a typical user of the lighting control system 100. A motorized window treatment (MWT) control module 116 is coupled to the motorized roller shade 108 for controlling the position of the fabric of the roller shade and the amount of daylight entering the room. Preferably, the MWT control module 116 is located inside the roller tube of the motorized roller shade 108, and is thus inaccessible to the user of the system.

A first wall-mounted master control 118 and a second wall-mounted master control 120 each comprise a plurality of buttons that allow a user to control the intensity of the lighting loads 104, 106 and the position of the motorized roller shade 108. In response to an actuation of one of the buttons, the first and second wall-mounted master controls 118, 120 transmit RF signals 110 to the wall-mounted dimmer 112, the remote dimming module 114, and the MWT control module 116 to control the associated loads.

Preferably, the control devices of the lighting control system 100 are operable to transmit and receive the RF signals 110 on a plurality of channels (i.e., frequencies). A repeater 122 is operable to determine a select one of the plurality of channels for all of the control devices to utilize. The repeater 122 also receives and re-transmits the RF signals 110 to ensure that all of the control devices of the lighting control system 100 receive the RF signals. Each of the control devices in the RF lighting control system comprises a serial number that is preferably six bytes in length and is programmed in a memory during production. As in the prior art control systems, the serial number is used to uniquely identify each control device during initial addressing procedures.

The lighting control system 100 further comprises a first circuit breaker 124 coupled between the HOT connection 102 and a first power wiring 128, and a second circuit breaker 126 coupled between the HOT connection 102 and a second power wiring 130. The wall-mounted dimmer 112, the first wall-mounted master control 118, the remote dimming module 114, and the MWT control module 116 are coupled to the first power wiring 128. The repeater 122 and the second wall-mounted master control 120 are coupled to the second power wiring 130. The repeater 122 is coupled to the second power wiring 130 via a power supply 132 plugged into a wall-mounted electrical outlet 134. The first and second circuit breakers 124, 126 allow power to be disconnected from the control devices and the electrical loads of the RF lighting control system 100.

The first and second circuit breakers 124, 126 preferably include manual switches that allow the circuit breakers to be reset to the closed position from the open position. The manual switches of the first and second circuit breakers 124, 126 also allow the circuit breakers to be selectively switched to the open position from the closed position. The construction and operation of circuit breakers is well known and, therefore, no further discussion is necessary.

Figure 2:
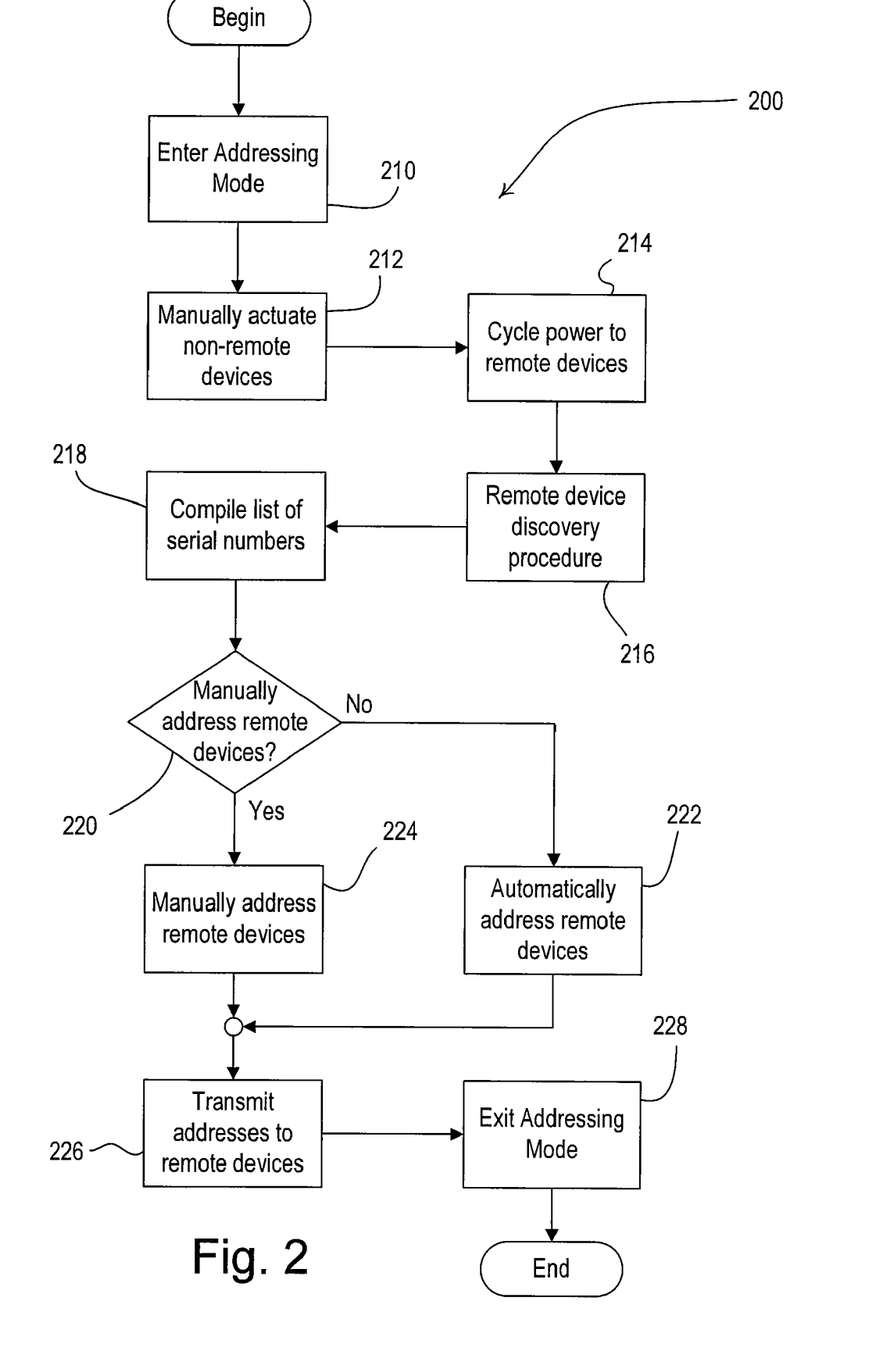
FIG. 2 is a flowchart of an addressing procedure for the RF lighting control system of FIG. 1 according to the present invention.

FIG. 2 is a flowchart of an addressing procedure 200 for the lighting control system 100 according to the present invention. The addressing procedure 200 is operable to assign device addresses to remotely-located control devices, such as, for example, the remote dimming module 114 and the MWT control module 116. Since an unaddressed control device does not know which of the available communication channels the repeater 122 has selected for use during normal operation, all of the unaddressed control devices communicate on a predetermined addressing channel that is different than the selected channel. Each of the remote devices includes a number of flags that are utilized during the addressing procedure 200. The first flag is a POWER_CYCLED flag that is set when power has recently been cycled to the remote device. As used herein, "power cycling" is defined as removing power from a control device and then restoring power to the control device to cause the control device to restart or reboot. The second flag is a FOUND flag that is set when the remote device has been "found" by a remote device discovery procedure 216 to be described in greater detail below with reference to FIG. 3.

The addressing procedure 200 begins when the lighting control system 100 enters an addressing mode at step 210, for example, in response to a user pressing and holding an actuator on the repeater 122 for a predetermined amount of time. At step 212, the user manually actuates the non-remote devices, i.e., the wall-mounted dimmer 112 and the first and second wall-mounted master controls 118, 120, as in the addressing procedure of the prior art lighting control system disclosed in the '442 patent. In response to an actuation of a button, the non-remote devices transmit a signal associated with the actuation of the button to the repeater 122 on the predetermined addressing channel. Accordingly, the repeater 122 receives the signal, which is interpreted as a request for an address, and transmits the next available device address to the actuated non-remote control device.

Next, the remote control devices, i.e., the remote dimming module 114 and the MWT control module 116, are assigned device addresses. In order to prevent the inadvertent assignment of addresses to unaddressed devices in a neighboring RF lighting control system, e.g., an RF lighting control system installed within approximately 60 feet of the system 100, the user cycles power to all of the remote devices at step 214. For example, the user switches the first circuit breaker 124 to the open position in order to disconnect the source from the first power wiring 128, and then immediately switches the first circuit breaker back to the closed position to restore power. Accordingly, the power provided to the remote dimming module 114 and the MWT control module 116 is cycled. Upon power-up, these remotely-located control devices enters a "power-cycled" state. Specifically, the remote devices set the POWER_CYCLED flag in memory to designate that power has recently been applied. Further, the remote devices begin to decrement a "power-cycled" timer. Preferably, the "power-cycled" timer is set to expire after approximately 10 minutes, after which the remote devices clear the POWER_CYCLED flag.

Figure 3:
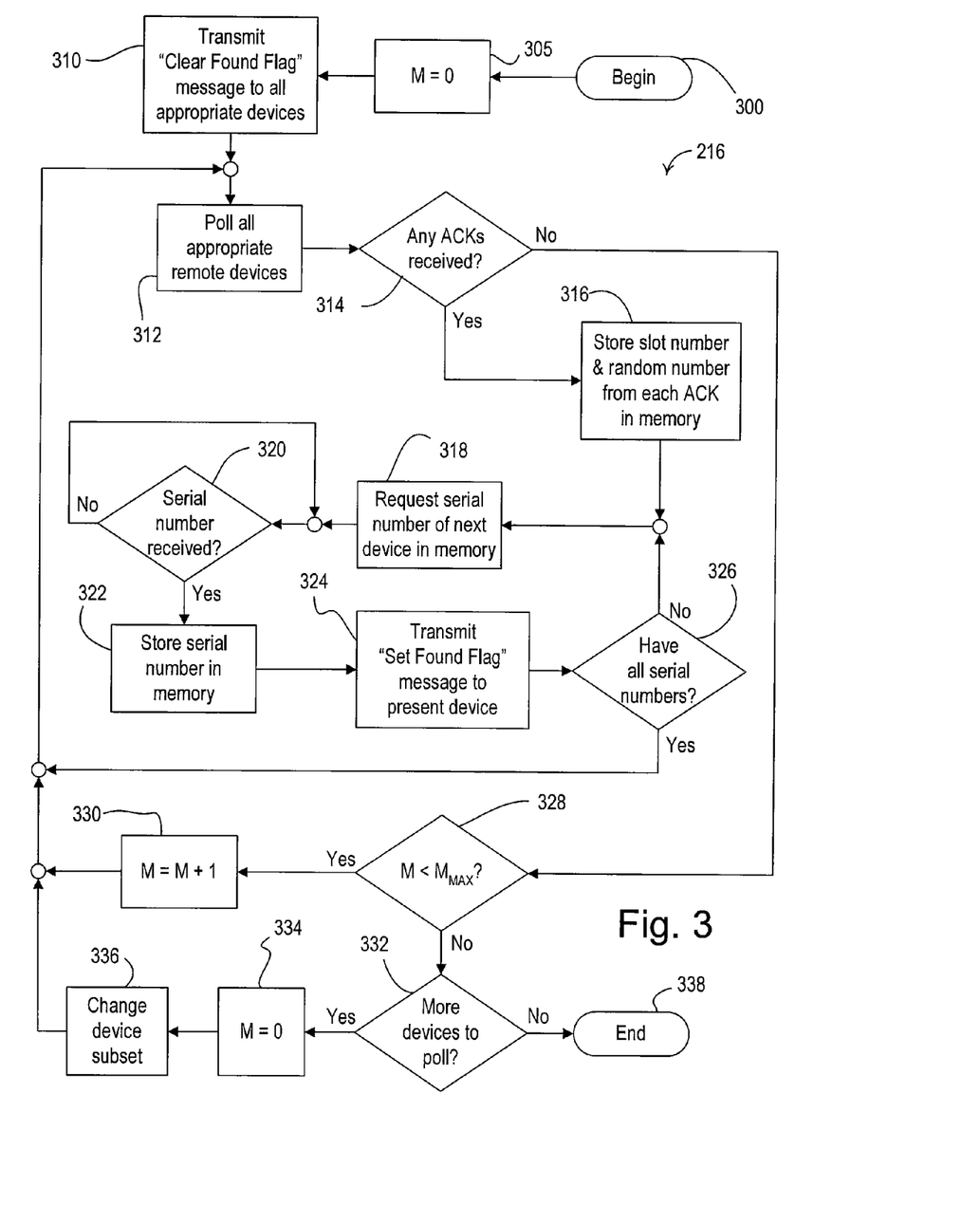
FIG. 3 is a flowchart of a remote device discovery procedure for the RF lighting control system of FIG. 1.

At this time, the remote device discovery procedure 216, which is shown in FIG. 3, is executed by the repeater 122. The remote device discovery procedure 216 is performed on all "appropriate" control devices, i.e., those devices that are unaddressed, have not been found by the remote device discovery procedure (i.e., the FOUND flag is not set), and have recently had power cycled (i.e., the POWER_CYCLED flag is set). Accordingly, the remote device discovery procedure 216 must be completed before the "power-cycled" timer in each applicable control device expires.

Referring to FIG. 3, the remote device discovery procedure 216 begins at step 300. A variable M, which is used to determine the number of times that one of the control loops of the remote device discovery procedure 216 repeats, is set to zero at step 305. At step 310, the repeater 122 transmits a "clear found flag" message to all appropriate devices. When an unaddressed control device that has the POWER_CYCLED flag set receives the "clear found flag" message, the control device reacts to the message by clearing the FOUND flag. At step 312, the repeater 122 polls, i.e., transmits a query message to, a subset of the appropriate remote devices. The subset may be, for example, half of the appropriate remote devices, such as those unaddressed control devices that have not been found, have been recently power cycled, and have even serial numbers. The query message contains a request for the receiving control device to transmit an acknowledgement (ACK) message containing a random data byte in a random one of a predetermined number of ACK transmission slots, e.g., preferably, 64 ACK transmission slots. The appropriate remote devices respond by transmitting the ACK message, which includes a random data byte to the repeater 122 in a random ACK transmission slot. At step 314, if at least one ACK message is received, the repeater 122 stores the number of the ACK transmission slot and the random data byte from each ACK message in memory at step 316.

Next, the repeater 122 transmits a "request serial number" message to each device that was stored in memory (i.e., each device having a random slot number and a random data byte stored in memory at step 316). Specifically, at step 318, the repeater transmits the message to the "next" device, e.g., the first device in memory when the "request serial number" message is transmitted for the first time. Since the repeater 122 has stored only the number of the ACK transmission slot and the associated random data byte for each device that transmitted an ACK message, the "request serial number" message is transmitted using this information. For example, the repeater 122 may transmit a "request serial number" message to the device that transmitted the ACK message in slot number 34 with the random data byte 0xA2 (hexadecimal). The repeater 122 waits to receive a serial number back from the device at step 320. When the repeater 122 receives the serial number, the serial number is stored in memory at step 322. At step 324, the repeater transmits a "set found flag" message to the present control device, i.e., to the control device having the serial number that was received at step 320. Upon receipt of the "set found flag" message, the remote device sets the FOUND flag in memory, such that the device no longer responds to query messages during the remote device discovery procedure 216. At step 326, if all serial numbers have not been collected, the process loops around to request the serial number of the next control device at step 318.

Since collisions might have occurred when the remote devices were transmitting the ACK message (at step 314), the same subset of devices is polled again at step 312. Specifically, if all serial numbers have been collected at step 326, the process loops around to poll the same subset of devices again at step 312. If no ACK messages are received at step 314, the process flows to step 328. If the variable M is less than a constant $M_{MAX}$ at step 328, the variable M is incremented at step 330. To ensure that all of the devices in the first subset have transmitted an ACK message to the query at step 312 without a collision occurring, the constant $M_{MAX}$ is preferably two (2) such that the repeater 122 preferably receives no ACK messages at step 314 in response to transmitting two queries at step 312. If the variable M is not less than the constant $M_{MAX}$ at step 328, then a determination is made at step 332 as to whether there are more devices to poll. If so, the variable M is set to zero at step 334 and the subset of devices (that are polled in step 312) is changed at step 336. For example, if the devices having even serial numbers were previously polled, the subset will be changed to those devices having odd serial numbers. If there are no devices left to poll at step 332, the remote device discovery procedure exits at step 338.

Referring back to FIG. 2, at step 218, the repeater 122 compiles a list of serial numbers of all remote devices found in the remote device discovery procedure 216. At step 220, the user is presented with the option of either manually or automatically addressing the remote devices. If the user does not wish to manually address the remote devices, the remote devices are automatically assigned addresses in step 222, for example, sequentially in the order that the devices appear in the list of serial numbers of step 218. Otherwise, the user may manually assign addresses to the remote devices at step 224. For example, the user may use a graphical user interface (GUI) software provided on a personal computer (PC) that is operable to communicate with the RF lighting control system 100. Accordingly, the user may step through each device in the list of serial numbers and individually assign a unique address. After the remote devices are either automatically addressed at step 222, or manually addressed at step 224, the addresses are transmitted to the remote control devices at step 226. Finally, the user causes the lighting control system 100 to exit the addressing mode at step 228, e.g., by pressing and holding an actuator on the repeater 122 for a predetermined amount of time.

The step of cycling power to the remote devices, i.e., step 214, prevents unaddressed devices in a neighboring system from being addressed. The step of cycling power to the remote devices is very important when many RF lighting control systems are being concurrently installed in close proximity, such as in an apartment building or a condominium, and are being configured at the same time. Since two neighboring apartments or condominiums will each have their own circuit breakers, the remote devices of each system can be separately power cycled. However, this step is optional since the user may be able to determine that the present lighting control system 100 is not located close to any other unaddressed RF lighting control systems. If the step of cycling power is omitted from the procedure 200, the repeater 122 will poll all unaddressed devices at step 312 in the remote device discovery procedure 216 rather than polling only unaddressed devices that have been recently power cycled. Further, the step of cycling power need not occur after step 212, but could occur at any time before the remote device discovery procedure, i.e., step 216, is executed, as long as the remote device discovery procedure is completed before the "power-cycled" timer expires.

The control devices of the lighting control system 100 are operable to transmit and receive the RF signals 110 on a plurality of channels. Accordingly, the repeater 122 is operable to determine the quality of each of the channels, i.e., determine the ambient noise on each of the channels, and to choose a select one of the channels for the system to communicate on. In prior art lighting control systems, an unaddressed control device communicated with the repeater on a predetermined addressing frequency in order to receive a unique device address and the selected channel. However, if there is a substantial amount of noise on the predetermined addressing frequency, the control devices are not able to communicate with the repeater and configuration of the control devices is hindered. Therefore, it is desirable to allow the RF lighting control system to communicate on the selected channel during the configuration procedure.

Figure 4:
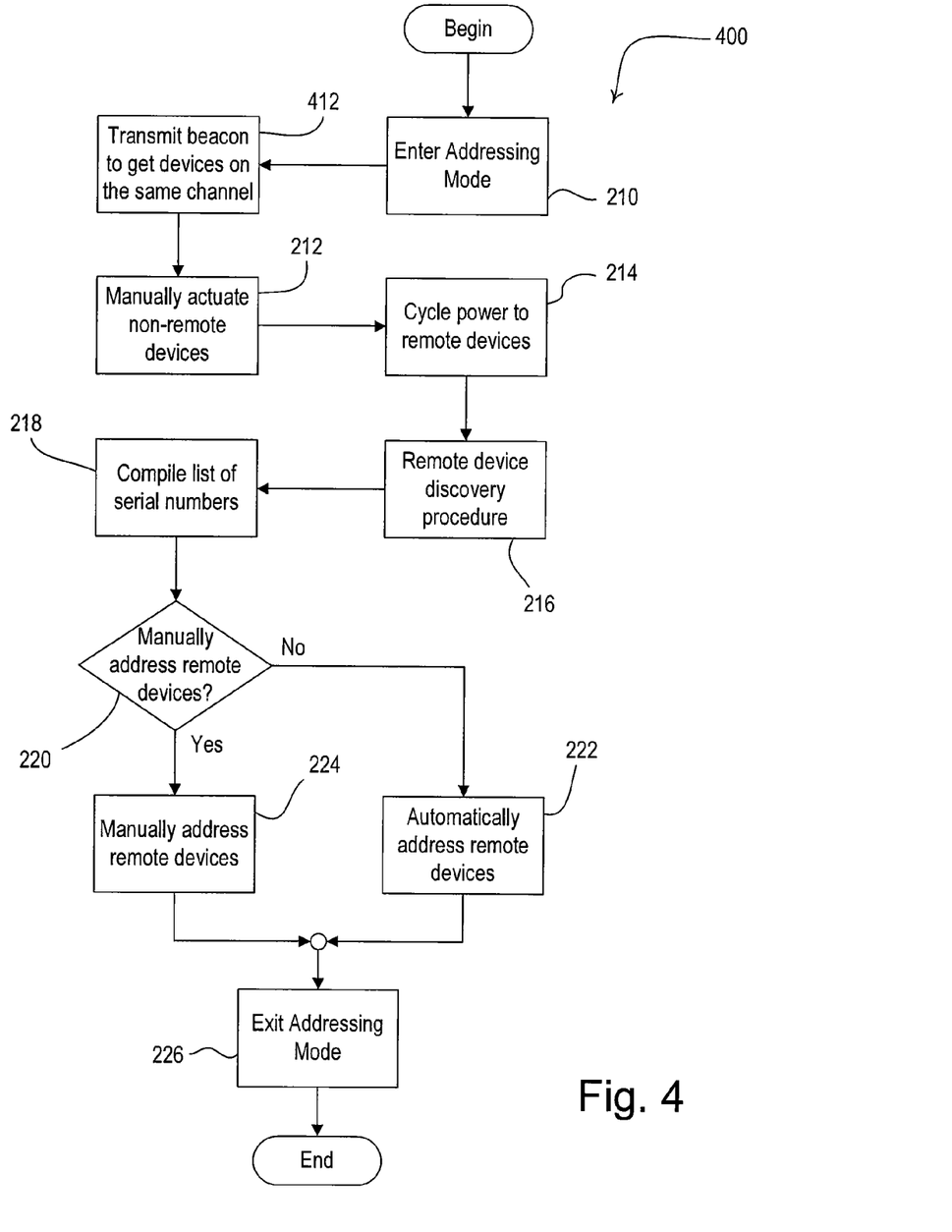
FIG. 4 is a flowchart of an addressing procedure according to a second embodiment of the present invention.

FIG. 4 is a flowchart of an addressing procedure 400 according to a second embodiment of the present invention. As in the addressing procedure 200, the control devices utilize the POWER_CYCLED flag and the FOUND flag during the addressing procedure 400. The addressing procedure 400 is very similar to the addressing procedure 200 of FIG. 2 and only the differences are noted below. Prior to the start of the addressing procedure 400, the repeater 122 preferably selects an optimum one of the available channels on which to communicate in order to cause all of the control devices to communicate on the selected optimum channel. To find an optimum channel, the repeater 122 selects at random one of the available radio channels, listens to the selected channel, and decides whether the ambient noise on that channel is unacceptably high. If the received signal strength is greater than a noise threshold, the repeater 122 rejects the channel as unusable, and selects a different channel. Eventually, the repeater 122 determines the optimum channel for use during normal operation. The procedure to determine the optimum channel is described in greater detail in the '728 patent.

Figures 5A, 5B:
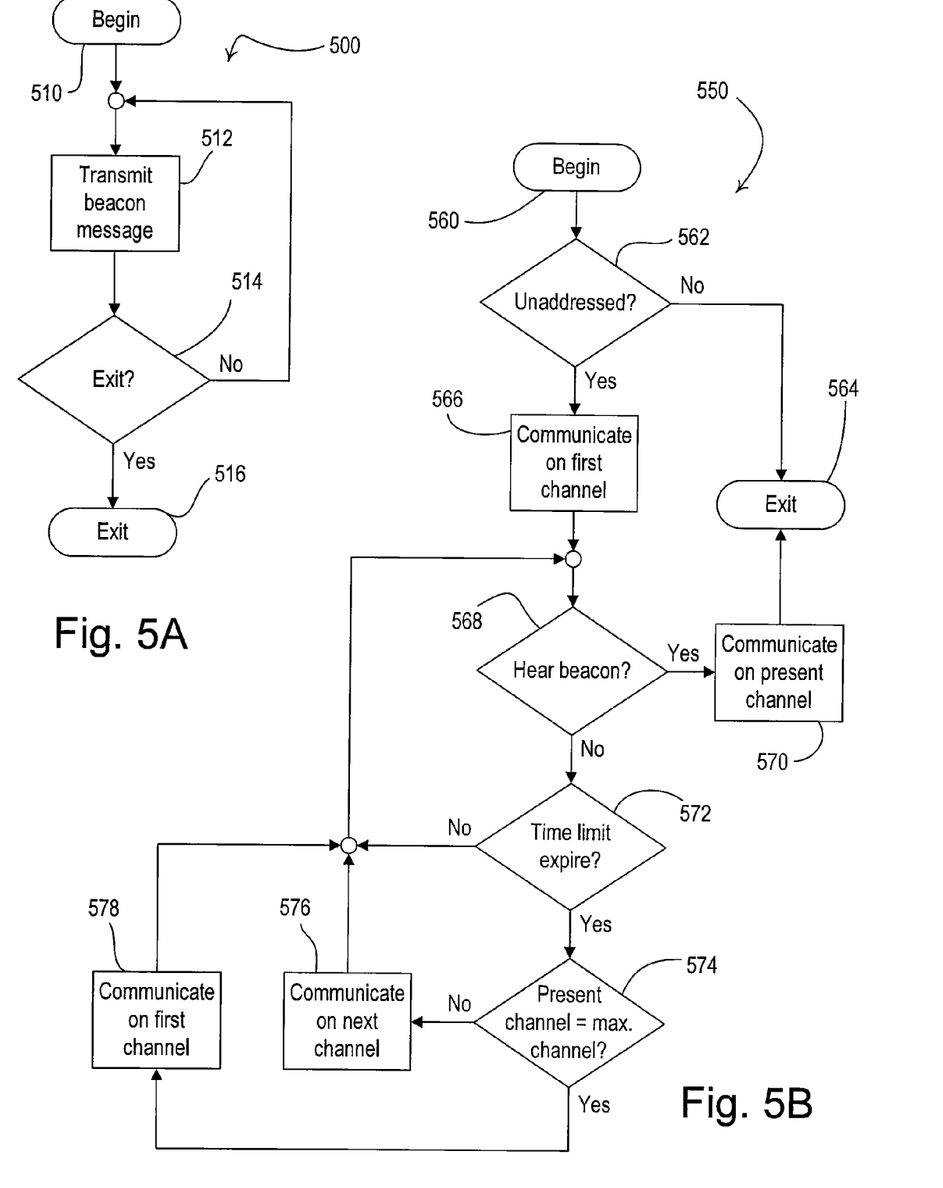
FIG. 5A is a flowchart of a first beacon process of the addressing procedure of FIG. 4.
FIG. 5B is a flowchart of a second beacon process of the addressing procedure of FIG. 4.

At step 412, the repeater 122 begins repeatedly transmitting a beacon message to the control devices on the selected channel. Each of the control devices sequentially changes to each of the available channels to listen for the beacon message. Upon receiving the beacon message, the control devices begins to communicate on the selected channel. FIG. 5A is a flowchart of a first beacon process 500 executed by the repeater 122 during step 212. FIG. 5B is a flowchart of a second beacon process 550 executed by each of the control devices at power up, i.e., when power is first applied to the control device.

Referring to FIG. 5A, the first beacon process 500 begins at step 510. The repeater 122 transmits the beacon message at step 512. Specifically, the beacon message includes a command to "stay on my frequency", i.e., to begin transmitting and receiving RF signals on the selected channel. Alternatively, the beacon message could comprise another type of control signal, for example, a continuous-wave (CW) signal, i.e., to "jam" the selected channel. At step 514, if the user has not instructed the repeater 122 to exit the beacon process 500, e.g., by pressing and holding an actuator on the repeater for a predetermined amount of time, then the process continues to transmit the beacon message at step 512. Otherwise, the beacon process exits at step 516.

The second beacon process 550, which is executed by each of the control devices of the RF lighting control system 100 at power up, begins at step 560. If the control device has a unique device address at step 562, the process simply exits at step 564. However, if the control device is unaddressed at step 562, the control device begins to communicate on the first channel (i.e., to listen for the beacon message on the lowest available channel) and a timer is initialized to a constant $T_{MAX}$ and starts decreasing in value at step 566. If the control device hears the beacon message at step 568, the control device maintains the present channel as the communication channel at step 570 and exits the process at step 564.

Preferably, the control device listens for a predetermined amount of time (i.e., corresponding to the constant $T_{MAX}$ of the timer) on each of the available channels and steps through consecutive higher channels until the control device receives the beacon message. Preferably, the predetermined amount of time is substantially equal to the time required to transmit the beacon message twice plus an additional amount of time. For example, if the time required to transmit the beacon message once is approximately 140 msec and the additional amount of time is 20 msec, the predetermined amount of time that the control device listens on each channel is preferably 300 msec. Specifically, if the control device does not hear the beacon message at step 568, a determination is made as to whether the timer has expired at step 572. If the timer has not expired, the process loops until the timer has expired. At step 574, if the present channel is not equal to the maximum channel, i.e., the highest available channel, the control device begins to communicate on the next higher available channel and the timer is reset at step 576. Then, the control device listens for the beacon message once again at step 568. If the present channel is equal to the maximum channel at step 574, the control device begins to communicate again on the first channel and the timer is reset at step 578. Accordingly, the second beacon process 550 continues to loop until the control device receives the beacon message.

While the present invention has been described with reference to an RF lighting control system, the procedures of the present invention could be applied to other types of lighting control system, e.g., a wired lighting control system, in order to assign an address to a remotely-located control device on a wired communication link.

Although the present invention has been described in relation to particular embodiments thereof, many other variations and modifications and other uses will be apparent to those skilled in the art. It is preferred, therefore, that the present invention be limited not by the specific disclosure herein, but only by the appended claims.

What is claimed is:

1. A method for assigning a unique device address to a control device in a control system, the control device adapted to be coupled to a source of power, a switch coupled in series between the source of power and the control device, the method comprising the steps of:
   initiating by an addressing device a repeated transmission of a wireless beacon signal;
   subsequently operating the switch to cycle power to the control device by interrupting and immediately restoring power to the control device;
   the control device receiving the wireless beacon signal within a predetermined amount of time after the step of operating the switch to cycle power;
   the control device subsequently transmitting a signal to the addressing device uniquely identifying the control device;
   identifying by the addressing device the control device using the signal uniquely identifying the control device;
   transmitting by the addressing device the unique device address to the control device in response to the step of identifying the control device; and the control device subsequently receiving the unique device address.

2. The method of claim 1, wherein the step of transmitting a signal uniquely identifying the control device comprises:
   transmitting a serial number of the control device.

3. The method of claim 2, wherein the step of transmitting the unique device address to the control device further comprises transmitting the unique device address to the control device using the serial number.

4. The method of claim 2, further comprising the step of:
   the control device receiving a query message from the addressing device prior to the step of transmitting a signal uniquely identifying the control device;
   wherein the step of transmitting a signal uniquely identifying the control device further comprises the control device transmitting an acknowledgement message to the addressing device in response to the query message, the acknowledgement message transmitted in a random transmission slot and containing a random data byte; and
   wherein the step of identifying the control device further comprises identifying the control device by the random transmission slot and the random data byte.

5. The method of claim 1, wherein the control device is operable to communicate on a plurality of channels, the method further comprising the step of:
   establishing communication by the addressing device with the control device on a predetermined one of the plurality of channels.

6. The method of claim 5, wherein the step of establishing communication with the control device further comprises the steps of:

repeatedly transmitting by the addressing device the wireless beacon signal on the predetermined channel;

the control device listening for the beacon signal for a predetermined amount of time on each of a plurality of channels;

the control device receiving the wireless beacon signal on the predetermined channel; and the control device communicating with the addressing device on the predetermined channel.

7. The method of claim 6, wherein the step of repeatedly transmitting the wireless beacon signal further comprises transmitting a beacon message repeatedly on the predetermined channel.

8. The method of claim 1, further comprising the step of:

starting a timer by the control device immediately after the step of operating the switch to cycle power to the control device;

wherein the timer is set to time out after the predetermined amount of time.

9. The method of claim 8, further comprising the steps of:

entering by the control device a first predetermined state immediately after the step of operating the switch to cycle power to the control device; and exiting by the control device the first predetermined state when the timer times out after the predetermined amount of time;

wherein the control device is operable to complete the step of transmitting a signal uniquely identifying the control device while the control device is in the first predetermined state.

10. The method of claim 1, wherein the control system comprises a wireless control system, and the step of transmitting a signal uniquely identifying the control device further comprises the control device transmitting wirelessly a signal uniquely identifying the control device within the predetermined amount of time after the step of operating the switch to cycle power to the control device.

11. The method of claim 1, wherein the control device comprises a load control device.

12. A method for providing an address to a first remote control device in an RF control system, wherein RF control signals are sent from a second device to the first remote control device, the RF control signals including the address to enable the first remote control device to respond to the RF control signals, the first remote control device adapted to be coupled to a AC power source, a switch coupled in series between the AC power source and the first remote control device, the method comprising the steps of:

initiating by the second device the repeated transmission of a wireless beacon signal;

operating the switch to cycle power to the first remote control device by interrupting and immediately restoring power to the first remote control device to designate the first remote control device as requiring the address;

receiving the wireless beacon signal at the first remote control device;

transmitting to the second device from the first remote control device a signal uniquely identifying the first remote control device within a predetermined amount of time after the step of operating the switch to cycle power to the first remote control device;

identifying at the second device the first remote control device designated as requiring the address in response to the signal uniquely identifying the first remote control device; and providing the address to the first remote control device by sending an RF addressing signal from the second device to the first remote control device to enable the first remote control device to respond to RF control signals sent from the second device that include the address.

13. The method of claim 12, wherein the step of cycling power causes the first remote control device to be placed in a first predetermined state.

14. The method of claim 13, wherein the step of identifying further comprises:

receiving a signal at the second device uniquely identifying the first remote control device within a predetermined amount of time after the step of cycling power.

15. The method of claim 14, wherein the step of identifying comprises:

determining at the second device a unique identifier of the first remote control device and compiling a list at the second device including the unique identifier of the first remote control device and unique identifiers of other remote control devices.

16. The method of claim 15, wherein the step of identifying further comprises:

selecting the first remote control device from the list of the unique identifiers of the remote control devices.

17. The method of claim 14, wherein the second device automatically provides an address to the first remote control device in the first predetermined state.

18. The method of claim 14, wherein the step of identifying further comprises:

the second device transmitting a polling signal to the first remote control device;

the first remote control device transmitting an acknowledgment signal to the second device;

the second device transmitting a unique identifier signal to the first remote control device to obtain the unique identifier of the remote control device; and the first remote control device transmitting the unique identifier to the second device.

19. The method of claim 12, further comprising the step of: initiating an addressing mode at the second device.

20. The method of claim 19, further comprising the step of: exiting the addressing mode.

21. The method of claim 12, wherein the switch comprises a circuit breaker.

22. A method for selecting a first remotely-located control device from a plurality of control devices in a control system, each of the plurality of control devices adapted to be coupled to a source of power and having a unique serial number, a switch coupled in series between the source of power and a subset of the plurality of control devices, the subset containing the first remotely-located control device, the method comprising the steps of:

initiating by an addressing device the repeated transmission of a wireless beacon signal to the plurality of control devices;

operating the switch to cycle power by interrupting and immediately restoring power to the subset of the plurality of control devices;

receiving the beacon signal at each of the control devices of the subset of the plurality of control devices within a predetermined amount of time after the step of operating the switch to cycle power;

receiving a signal from the addressing device requesting the serial number at each of the control devices of the subset;

transmitting the serial number to the addressing device of at least one of the control devices of the subset;

generating by the addressing device a list of the serial numbers; and selecting by the addressing device the first remotely-located control device from the list of serial numbers; and assigning by the addressing device a unique device address to the first remotely-located control device after the step of selecting the first control device.

23. The method of claim 22, wherein the control system comprises a wireless control system.

24. The method of claim 4, further comprising the step of:

requesting by the addressing device the serial number of the control device prior to the step of transmitting a serial number.

25. A method for assigning a unique device address to an unaddressed remotely-located control device in a control system, the control device operable to be coupled to a source of power, the method comprising the steps of:

an addressing device initiating the repeated transmission of a wireless beacon signal;

operating a switch to cycle power to the control device by interrupting and immediately restoring power to the control device;

starting a timer at the control device immediately after the step of cycling power, the timer set to time out after a predetermined amount of time;

the control device receiving the wireless beacon signal within the predetermined amount of time;

the control device subsequently transmitting to the addressing device a signal uniquely identifying the control device within the predetermined amount of time; and the control device subsequently receiving from the addressing device the unique device address.

26. The method of claim 25, further comprising the steps of:

entering by the control device a first predetermined state immediately after the step of applying power; and exiting by the control device the first predetermined state when the timer times out after the predetermined amount of time;

wherein the control device is operable to complete the step of transmitting a signal uniquely identifying the control device while the control device is in the first predetermined state.

* * * * *